Patented Dec. 26, 1944

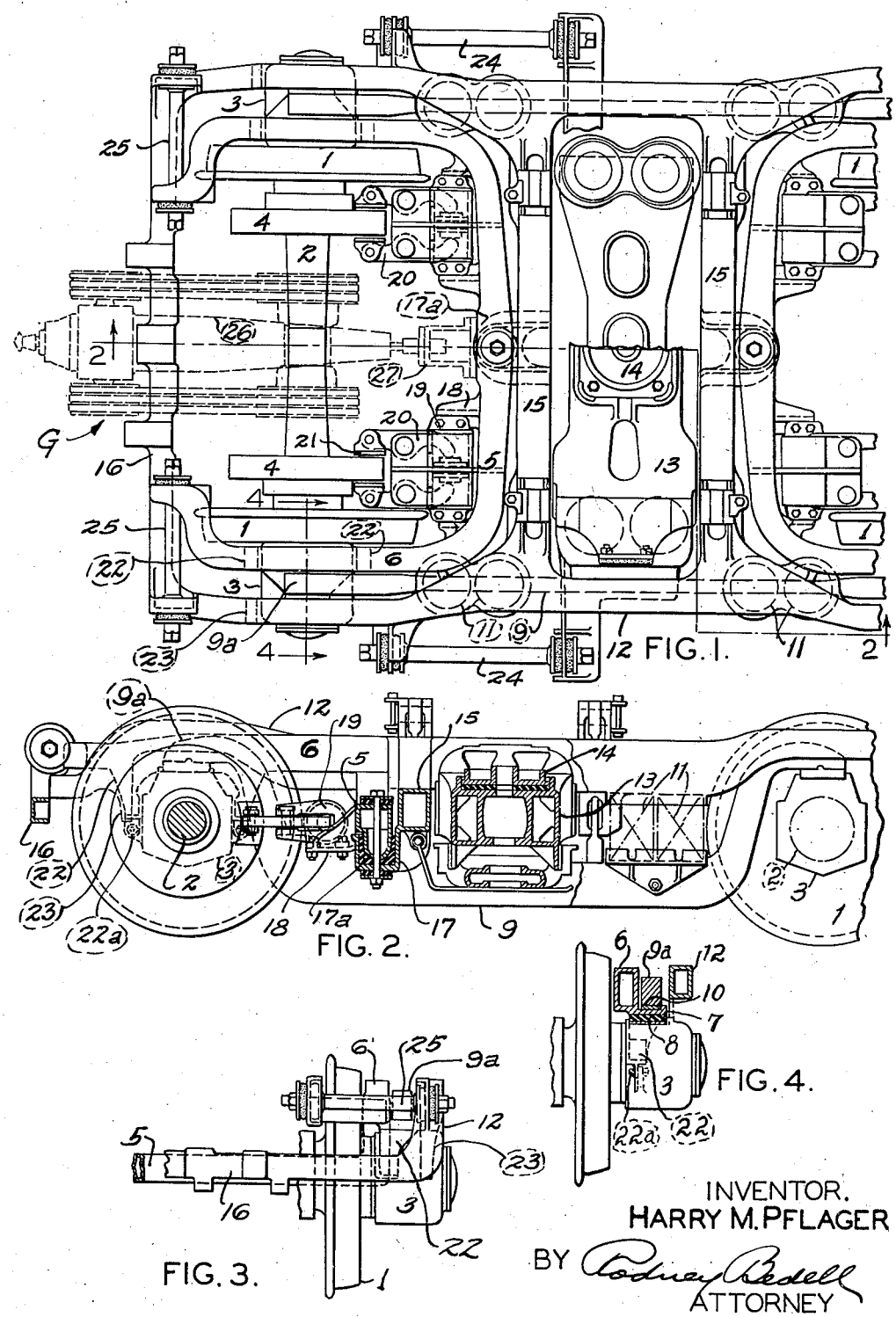

2,365,724

UNITED STATES PATENT OFFICE 2,365,724

RAILWAY TRUCK STRUCTURE

Harry M. Pflager, St. Louis, Mo., assignor to General Steel Castings Corporation, Granite City, Ill., a corporation of Delaware Application June 18, 1942, Serial No. 447,496

6 Claims. (Cl. 188—205)

The invention relates to railway rolling stock and more particularly to the support of the truck brake gear and its operating mechanism and to the mounting of structure such as an electric generator or generator drive device on the truck.

The invention relates to trucks of the type shown in Letters Patent Nos. 2,276,336 and 2,276,337, issued to the present inventor March 17, 1942, and shown in application Serial No. 434,898, filed by the present inventor March 16, 1942.

The main object of the invention is to provide satisfactory support for the brake gear and to satisfactorily position the same relative to the truck axle and other parts. This general object corresponds to the general object of each of the above-mentioned patents and application.

A specific object of the invention is to provide for the yielding support of the truck frame and its load, including electric generator structure, on the axles and at the same time to provide for movement of an axle brake structure with the wheeled axle to which it is applied.

Another specific object of the invention is to maintain a brake frame, carrying an axle brake structure, and the truck axles and journal boxes against undesired movement transversely and longitudinally of the truck relative to the truck frame irrespective of the tendency to shift these parts due to acceleration and deceleration in the travel of the truck on curved track and for other causes.

These objects and other detailed objects are attained by the structure illustrated in the accompanying drawing in which—

Figure 1 is a top view of the major portion of a railway four-wheel truck embodying the invention.

Figure 2 is a vertical longitudinal section taken on section line 2—2 of Figure 1.

Figure 3 is an end view of one corner of the truck.

Figure 4 is a vertical transverse section taken on the line 4—4 of Figure 1.

The truck includes the usual wheels 1 with axles 2 provided with journal boxes 3 and with brake drums or discs 4 spaced inwardly of the journal boxes and wheels. Associated with each axle is a brake frame 5 having a general U or C shape with side members 6 provided with brackets 7 resting on journal boxes 3 either directly or through rubber pads as indicated at 8. Extending between the journal boxes at the same side of the truck are equalizers 9, the end portions 9a of the equalizers resting upon the brake frame brackets 7 either directly or through intermediate pads indicated at 10. Coil springs 11 spaced from the journal boxes are mounted on equalizers 9 and yieldingly support the truck load carrying frame 12 which may be provided with a lateral motion bolster 13 having a center plate 14 for pivotal support of the vehicle body center plate (not shown).

Truck frame 12 includes transverse transoms 15 and 16, the former extending adjacent the load carrying bolster and the latter extending adjacent the outer edges of wheels 1. Each transom 15 has a bracket 17 provided with a universal joint bearing 17a for supporting the inner central portion of the adjacent brake gear carrying frame 5. The bearing includes male and female members with a rubber cushion between them as detailed and claimed in the above mentioned Letters Patent No. 2,276,337, but preferably at least one of the members has a spherical contour, as shown, to better accommodate tilting movement of brake frame relative to the truck frame. Frames 5 have brackets 18 for mounting brake gear operating air cylinders 19 and their levers 20 and shoes 21 disposed at opposite sides of drums 4 in a well-known manner.

Each brake frame has legs 22 depending at opposite sides of the journal boxes to prevent or limit the relative movement of the brake frame and journal boxes longitudinally of the truck. Truck frame 12 has a depending leg 23 at the outer side of each journal box and forming a safety device to maintain the assembly of the frame and wheeled axles but ordinarily the truck frame is held against movement longitudinally of the truck relative to the gear carrying frame by the connection between parts at bracket 17 on the transom and against movement laterally by the same connection and the anchor rods 25 which are well-known in the art, being detailed in V. L. Green Reissue Patent No. 21,987, issued December 30, 1941. The truck frame is held against movement longitudinally of the truck relative to the bolster by means of the anchors 24 which are similar to anchors 25. If desired, the lower ends of legs 22 may be bolted to the journal boxes, as indicated at 22a.

A generator support and drive mechanism indicated generally at G is mounted on one of the truck frame end transoms 16 between the sides of the brake gear carrying frame and lies in the same general plane as the brake gear and its carrying frame. As in the above-mentioned application Serial No. 434,898, the generator drive support and guide plate 26 rests on transom 16 and has its inner end secured by bracket 27 to the transverse member of the brake frame 5, but if desired the plate 26 may be extended over the transverse member of frame 5 and secured by bracket 27 to the truck frame transom 15 as described and claimed in my application filed August 12, 1942, Serial No. 455,562.

With this arrangement the load on the equalizer tends to keep the brake frame in proper relation with the journal box at all times and also tends to keep the shoes on the brake levers in proper relation with the disc on the axle during relative vertical movements of the wheels and truck frame. Also the arrangement accommodates the location of the generator structure upon the truck frame whereby the generator structure is spring borne and moves more nearly in accordance with the vehicle body which carries the battery and other parts associated with the generator structure.

Relative vertical movement of the truck frame and brake gear carrying frame is accommodated by the pivotal connection at 17a without disturbing the desired relation between the interengaging brake parts mounted upon the axle and the brake gear carrying frame respectively, and all of this structure is adequately supported and held in desired spaced relation without interfering with the mounting of generator structure on the end of the truck frame.

A generator housing may be mounted directly on the truck frame end transom in place of the support arm illustrated and other variations in the details of the described structure may be made without departing from the spirit of the invention, and the exclusive use of such modifications as come within the scope of the claims is contemplated.

What is claimed is:

1. In a railway truck, wheeled axles, journal boxes thereon, a brake drum on one of the axles, an individual framing member supported from the journal boxes of one axle, an equalizer at each side of the truck extending between the axles and being supported therefrom, a truck load carrying frame spring-supported from said equalizers and providing a support for said member at a point spaced longitudinally of the truck from its supporting journal boxes, and friction elements for application to said drum and actuating mechanism therefor carried by said member, the truck load carrying frame including an end transverse transom positioned outwardly of the wheels, there being an electric generator device carried on said transom between the side portions of the brake gear carrying framing member and extending longitudinally of the truck abreast of the brake drum on the adjacent axle.

2. In a railway truck, wheeled axles, journal boxes thereon, a brake drum on one of the axles, a truck frame supported from said journal boxes, a brake gear carrying frame supported from the journal boxes of said axle and supported from said truck frame at a point on the latter between said axle and the middle of the truck, the outer ends of the sides of the gear carrying frame terminating near the associated wheels, and an electric generator device carried on said truck frame between said ends of the gear carrying frame, there being friction elements for application to said drum and actuating mechanism therefor carried by said gear carrying frame and spaced transversely of the truck from said generator device.

3. A truck as described in claim 2 in which the support of the truck frame from the journal boxes includes equalizers with end portions mounted on the box-supported portions of the gear carrying frame, there being truck frame supporting springs on the equalizers spaced from the end portions of the latter.

4. In a railway truck, spaced wheeled axles, journal boxes thereon, a brake drum on one of said axles, a C-shaped frame including side members, extending longitudinally of the truck and resting upon the journal boxes on said axle, and including a transverse member connecting the ends of said side members nearest the middle of the truck, elements carried on said frame for frictionally engaging the brake drum, power means carried on said frame for operating said elements, an equalizer at each side of the truck extending between and supported from the axles, a truck load carrying frame spring-supported from the equalizers and including a center transverse transom, adjacent the transverse member of the C-shaped frame and supporting the same, and including an end transverse transom below the level of the C-shaped frame, said end transverse transom and frame transverse member being arranged to support a generator structure extending longitudinally of the truck over said axle and between the side members of the C-shaped frame and abreast of said drum, friction elements and power means.

5. In a railway truck, spaced wheeled axles, journal boxes thereon, brake drums on one of said axles spaced apart a substantial distance from each other and from the longitudinal center line of the truck, a C-shaped frame including side members resting upon the journal boxes on said axle and extending therefrom longitudinally of the truck towards the middle of the truck, and including a transverse member connecting the ends of said side members nearest the middle of the truck, elements carried on said frame for frictionally engaging said drums, power means carried on said frame for operating said friction elements, an equalizer at each side of the truck and extending between and supported from said axles, a truck load carrying frame spring-supported from said equalizers and including a center transverse transom, adjacent the transverse member of the C-shaped frame and supporting the same, and including an end transverse transom below the level of the C-shaped frame, said end transverse transom and frame transverse member having portions constructed and arranged to support a generator structure extending longitudinally of the truck over said end transverse transom and said axle and between said drums, elements and power means.

6. In a railway truck, spaced wheeled axles, journal boxes thereon, a brake drum on one of said axles, a C-shaped frame including side members, extending longitudinally of the truck and resting upon the journal boxes on said axle, and including a transverse member connecting the ends of said side members nearest the middle of the truck, elements carried on said frame for frictionally engaging the brake drum, power means carried on said frame for operating said elements, an equalizer at each side of the truck extending between and supported from the axles, a truck load carrying frame spring-supported from the equalizers and including an end transverse transom below the level of said C-shaped frame and including a center transverse transom, adjacent the transverse member of said C-shaped frame and having a bracket underlying and supporting the same, a generator structure extending longitudinally of the truck over said axle and between the side members of said C-shaped frame and abreast of said drum, friction elements and power means, and mounted on said end transverse transom and the transverse member of the C-shaped frame.

H. M. PFLAGER.